United States Patent
Wang et al.

(10) Patent No.: US 6,445,447 B1
(45) Date of Patent: Sep. 3, 2002

(54) NEAR FIELD OPTICAL CERTIFYING HEAD FOR DISC ASPERITY MAPPING

(75) Inventors: Ling Wang, Eden Prairie; Li Li, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/047,202

(22) Filed: Mar. 24, 1998

Related U.S. Application Data
(60) Provisional application No. 60/064,561, filed on Oct. 27, 1997.

(51) Int. Cl.[7] .............................................. G01N 21/00
(52) U.S. Cl. ................................ 356/237.2; 356/243.3; 356/243.4
(58) Field of Search .......................... 356/237.2, 237.1, 356/237.3, 237.5, 242.3, 243.4, 243.8, 375; 369/44.1 I, 44.15, 44.23, 112; 360/25, 31, 75, 104, 113, 106, 103; 324/212, 252, 210, 211; 374/5

(56) References Cited

U.S. PATENT DOCUMENTS

| | | | |
|---|---|---|---|
| 3,980,811 A | 9/1976 | Schaefer et al. ............. 178/6.6 |
| 4,069,484 A | * 1/1978 | Firester et al. ........... 356/237.2 |
| 4,229,067 A | 10/1980 | Love ...................... 350/96.15 |
| 4,310,916 A | 1/1982 | Dil .............................. 369/109 |
| 4,443,700 A | 4/1984 | Macedo et al. ............. 250/227 |
| 4,505,585 A | * 3/1985 | Yoshikawa et al. ...... 356/237.2 |
| 4,569,038 A | 2/1986 | Nagashima et al. ........... 369/44 |
| 4,581,529 A | 4/1986 | Gordon ....................... 250/227 |
| 4,706,235 A | 11/1987 | Melbye ....................... 369/46 |
| 4,769,800 A | 9/1988 | Moser et al. ................. 369/12 |
| 4,815,064 A | 3/1989 | Melbye ....................... 369/59 |
| 4,832,487 A | * 5/1989 | Mikuriya et al. ........ 356/237.5 |
| 4,933,537 A | 6/1990 | Takahashi et al. .......... 235/454 |
| 4,994,658 A | 2/1991 | Takahashi et al. .......... 235/473 |
| 5,004,307 A | 4/1991 | Kino et al. ................... 350/1.2 |
| 5,096,277 A | 3/1992 | Kleinerman ................. 385/12 |
| 5,125,750 A | 6/1992 | Corle et al. ................. 359/819 |
| 5,138,676 A | 8/1992 | Stowe et al. ................. 385/32 |
| 5,153,870 A | 10/1992 | Lee et al. .................... 369/111 |
| 5,193,132 A | 3/1993 | Uken et al. ................... 385/32 |
| 5,212,379 A | 5/1993 | Naffarrate et al. ..... 250/227.14 |

(List continued on next page.)

FOREIGN PATENT DOCUMENTS
JP  2000-76726  * 3/2000

Primary Examiner—Frank G. Font
Assistant Examiner—Sang H. Nguyen
(74) Attorney, Agent, or Firm—Westman, Champlin & Kelly, P.A.

(57) ABSTRACT

An optical certifying head flies above a disc surface within an evanescent decay length of the disc surface. A light beam is focused through an objective lens, and further focused through a SIL. The SIL-focused light is coupled to the disc surface through near-field coupling. The light is reflected from the disc surface depending on a surface condition of the disc such that the surface condition can be determined.

14 Claims, 5 Drawing Sheets

U.S. PATENT DOCUMENTS

| | | | | |
|---|---|---|---|---|
| 5,278,812 A | | 1/1994 | Adar et al. | 369/44.12 |
| 5,280,340 A | * | 1/1994 | Lacey | 356/375 |
| 5,286,971 A | | 2/1994 | Betzig et al. | 250/227.26 |
| 5,363,463 A | | 11/1994 | Kleinerman | 385/123 |
| 5,450,203 A | | 9/1995 | Penkethman | 356/373 |
| 5,490,025 A | * | 2/1996 | Dorius et al. | 360/103 |
| 5,493,393 A | | 2/1996 | Beranek et al. | 356/328 |
| 5,497,359 A | | 3/1996 | Mamin et al. | 369/44.15 |
| 5,527,110 A | * | 6/1996 | Abraham et al. | 374/5 |
| 5,535,189 A | | 7/1996 | Alon et al. | 369/102 |
| 5,537,385 A | | 7/1996 | Alon et al. | 369/119 |
| 5,566,159 A | | 10/1996 | Shapira | 369/99 |
| 5,574,712 A | | 11/1996 | Alon et al. | 369/102 |
| 5,592,444 A | | 1/1997 | Alon et al. | 369/13 |
| 5,598,393 A | | 1/1997 | Alon et al. | 369/102 |
| 5,671,048 A | * | 9/1997 | Lacey | 356/375 |
| 5,689,064 A | * | 11/1997 | Kennedy et al. | 360/104 |
| 5,729,393 A | * | 3/1998 | Lee et al. | 359/819 |
| 5,825,181 A | * | 10/1998 | Schaenzer et al. | 324/212 |
| 5,881,042 A | * | 3/1999 | Knight | 369/99 |
| 5,901,001 A | * | 5/1999 | Meyer et al. | 360/25 |
| 5,917,788 A | * | 6/1999 | Mowry | 369/44.23 |
| 5,936,928 A | * | 8/1999 | Jain et al. | 369/99 |
| 5,946,282 A | * | 8/1999 | Hirono et al. | 369/112 |
| 6,125,008 A | * | 9/2000 | Berg et al. | 360/106 |

* cited by examiner

NEAR FIELD OPTICAL CERTIFYING HEAD FOR DISC ASPERITY MAPPING

This application claims the benefit of U.S. Provisional Patent Application No. 60/064,561, filed Oct. 27, 1997, entitled "NEAR FIELD OPTICAL CERTIFYING HEAD FOR DISC ASPERITY MAPPING," herein incorporated by reference.

BACKGROUND OF THE INVENTION

The present invention relates to systems for analyzing a surface of a rotating recording disc. More specifically, the present invention relates to an apparatus for detecting small defects on the surface of a rotating recording disc using a near field optical head.

In data processing systems, disc drives are often used as direct access storage devices. In such devices, read/write heads are used to write data on or read data from an adjacently rotating hard or flexible disk. To prevent damage to either the disc or the read/write head, it has been recognized that the surface of the disc should be very flat and free of any bumps or the like which might be contacted by the read/write head. Also, the read/write heads have been designed so that they will fly over the surface of the rotating disc with a small fly height which is maintained by a film of air. During its flight, the head undergoes continuous vibration, pitch and roll as the topography of the disc changes beneath the head. If the quality of the disc or the read/write head is poor, occasional rubbing or sharp contact may occur between the disc and the read/write head. Such contact may damage the head or the disc, cause loss of valuable data, or both of these.

Various attempts have been made to provide increased assurance that such undesirable contact between a read/write head and a recording disc does not occur. Rigid manufacturing and quality assurance specifications for both the recording disc and the read/write head have been instituted. Additionally, the art has compensated for the presence of these defects by increasing the fly height of the head, and incorporating correction algorithms into the disc drive circuitry.

Disc inspection for various types of defects, including magnetic, optical and topographic (i.e., delamination, voids inclusions, asperities, etc.) is of critical importance for the increasingly stringent production requirements facing a manufacturer today as smaller drives store more data. Various methods of defect inspection are currently in use. These include optical techniques (fiber interferometry, bulk optic shear interferometry, microISA), magnetic readout (simple screening, HRF, etc.) and mechanical testing. Each of these techniques may play a role in achieving the goal of virtually defect free production of magnetic discs. However, with the market tightening and technical requirements (such as fly height and speed) becoming more exacting and demanding, inspection schemes which are more efficient and accurate are highly advantageous.

There are various types of heads which are currently being used to screen the discs for surface variations or asperities ("surface variations" and "asperities" are intended to have identical meanings as used herein).

One such type is the certifier head. This is usually an MR read head which is used to map the disc for flaws in the magnetic layer. When the certifier head encounters a defect, the impact causes the MR element to heat which results in a change in resistance. This causes the MR element output to signal a super pulse followed by a missing pulse. The certifier head is typically used to scan only a portion of the disc (less than 50%) due to its small size, and generally does so at the same height as the product head. Additionally, defects below the normal product head fly height can easily be encountered by the product head in a stressed condition (for example at increased altitude).

SUMMARY OF THE INVENTION

An optical certifying head flies above a disc surface within an evanescent delay length of the disc surface. A light beam is focussed through an objective lens, and further focussed through a (Solid Immersion Lens) SIL. The SIL-focussed light is coupled to the disc surface through near-field coupling. The light is reflected from the disc surface depending on a surface condition of the disc such that the surface condition can be determined. A method of making the optical certifying head and a method of using it are also provided.

DETAILED DESCRIPTION OF THE PREFERRED EMBODIMENTS

Figure 1:
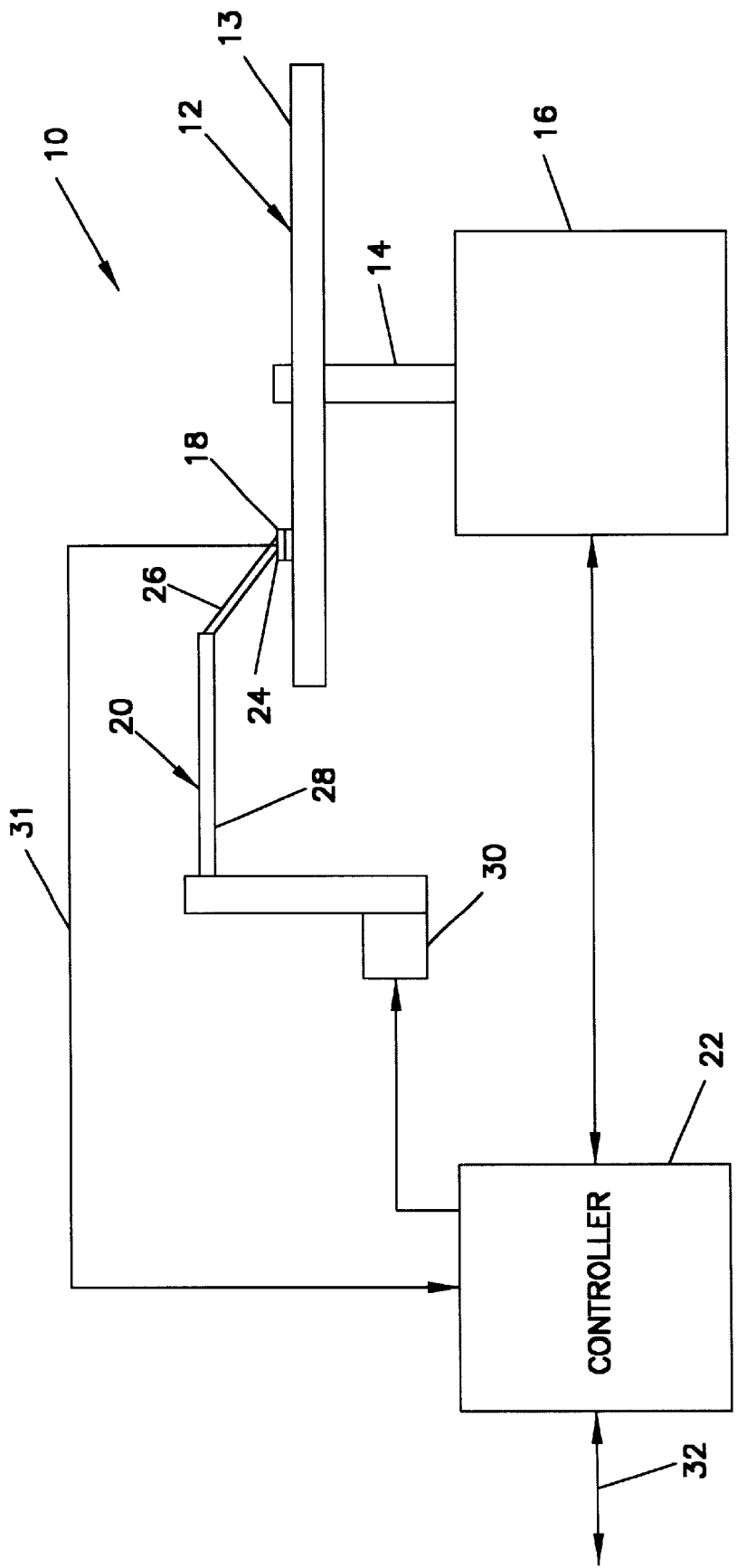
FIG. 1 is a block diagram of an apparatus 10 for detecting asperities on a disc in accordance with the present invention.

FIG. 1 is a block diagram of apparatus 10 for detecting asperities on disc 12 in accordance with the present invention. Apparatus 10 includes spindle 14, spindle motor 16, detect head 18, suspension assembly 20, and controller 22. Spindle 14 is adapted to detachably couple disc 12 such that disc 12 rotates with spindle 14. Spindle 14 is coupled to spindle motor 16 such that spindle 14 and disc 12 rotate upon energization of spindle motor 16. Preferably, spindle motor 16 also includes a rotary encoder for providing an encoder signal based on a rotary position or angular displacement of spindle 14 and disc 12.

Detect head 18 is adapted to fly over a surface 13 of disc 12 when disc 12 rotates. Additionally, detect head 18 is coupled to suspension assembly 20 such that detect head 18 is positionable with suspension assembly 20 over surface 13.

Suspension assembly 20 includes gimbal 24, flexure arm 26, load beam 28, and actuator 30. Gimbal 24 is coupled to detect head 18 thereby allowing detect head 18 to pitch and roll with the various contours of surface 13 of disc 12 as detect head 18 flies above disc 12. Gimbal 24 is coupled to flexure arm 26 which is further coupled to load beam 28. Actuator 30, which is preferably a voice coil motor, is coupled to load beam 28 such that energization of actuator 30 causes movement of detect head 18 over surface 13.

Controller 22 is coupled to spindle motor 16, actuator 30, and asperity detection sensors (not shown in FIG. 1) which are disposed on detect head 18. Controller 22 is coupled to spindle motor 16 such that by providing the energization signal, controller 22 controls the extent to which spindle motor 16 rotates spindle 14 and disc 12. Additionally, controller 22 receives the encoder signal such that controller 22 is provided with a signal based upon the rotary position of spindle 14 and disc 12. Controller 22 also provides an actuation signal to actuator 30 which causes actuator 30 to position detect head 18 over surface 13. Thus, controller 22 is able to determine the radial position of detect head 18 on the surface of disc 12. Additionally, controller 22 receives asperity detection signals 31 from asperity detect sensors (not shown in FIG. 1) on detect head 18, which will be described in greater detail with respect to FIGS. 2–4. Finally, controller 22 is adapted to determine an asperity location based on asperity detection signals 31, and provide an asperity location output signal to any suitable device through communication link 32.

Figure 2:
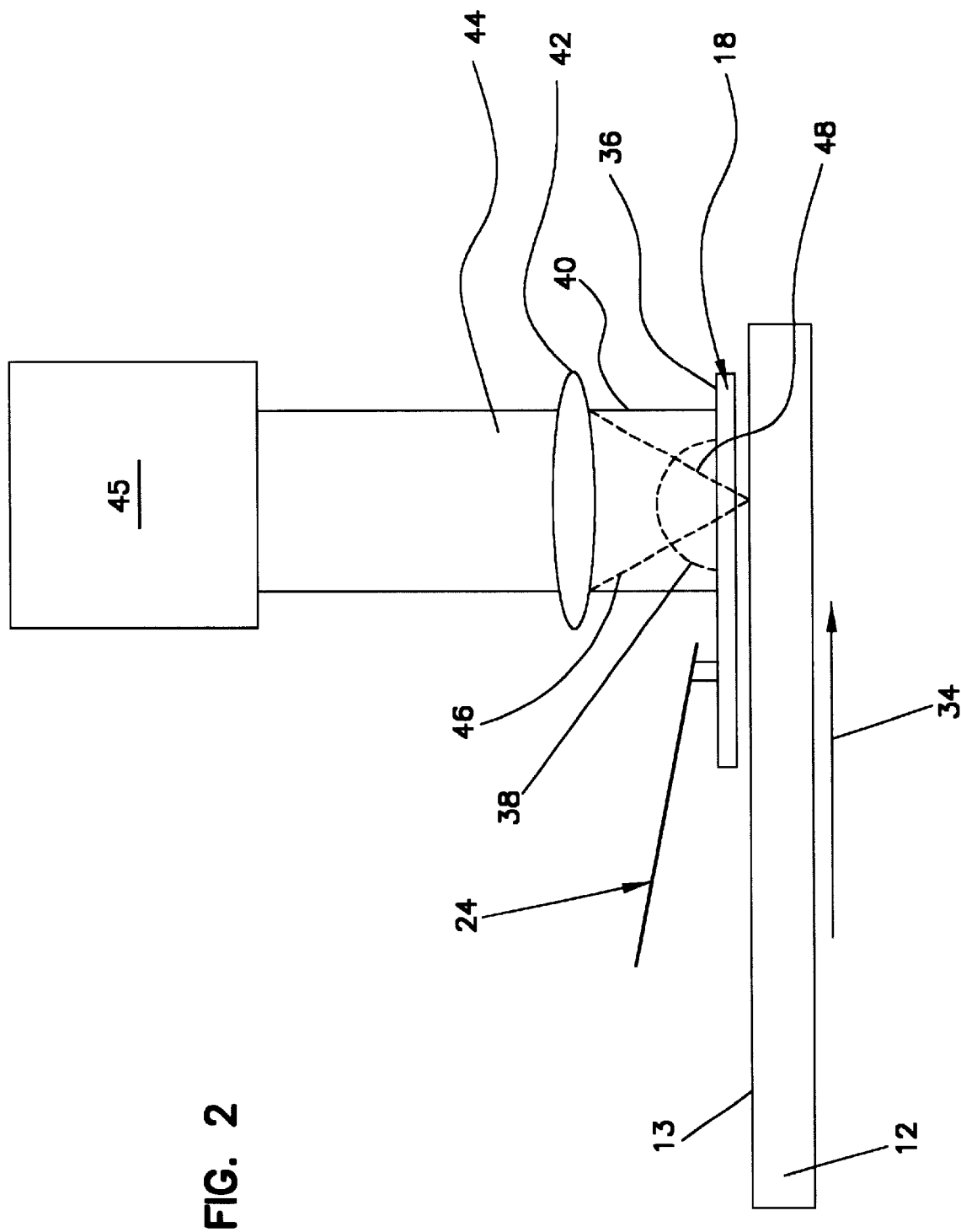
FIG. 2 is a side elevation view of an optical detect head flying over a disc in accordance with the present invention.

FIG. 2 is a side elevation view of certifying head 18 flying over disc 12, in accordance with the present invention. Certifying head 18 is shown flying above surface 13 of disc 12 separated by only a relatively small air gap as disc 12 moves in the direction of arrow 34. As can be seen in FIG. 2, certifying head 18 includes air bearing slider 36, solid immersion lens (SIL) 38, spacer tube 40, and objective lens 42. SIL 38, which is disposed on slider 36 and is preferably shaped hemispherically, is preferably constructed from a transparent material having a high index of refraction such as zirconia ($z_nO_2$). Spacer tube 40 is disposed oh slider 36 about SIL 38. Objective lens 42 is attached to one end of spacer tube 40 such that spacer tube 40 separates objective lens 42 from slider 36 by a predetermined distance (the length of spacer tube 40). The length of spacer tube 40 is selected such that SIL 38 is spaced from objective lens 42 by approximately the focal length of objective lens 42. Thus, light 44 which is emitted by light source 45, falls upon objective lens 42 and is focussed into objective lens focussed beam 46 which converges upon SIL 38. Within SIL 38, objective lens focussed beam 46 is further focussed into SIL focussed beam 48, in accordance with known properties of SIL lenses, as taught by Mammin et al. in U.S. Pat. No. 5,497,359 entitled "OPTICAL DISC DATA STORAGE SYSTEM WITH RADIATION-TRANSPARENT AIR BEARING SLIDER."

SIL focussed beam 48 is conveyed across an air gap separating surface 13 of disc 12 from certifying head 18. It is important that certifying head 18 fly at a fly height less than or equal to the evanescent decay length i.e., the near field in which fh is less than d. When the certifying head so flies, SIL focussed beam 48 will be effectively coupled to surface 13 of disc 12 via near field (evanescent) coupling. When surface 13 of disc 12 is smooth, the transferred light will be specularly reflected and such specular reflection may be detected as indicating the surface condition. However, as the light encounters asperities on surface 13, the light will be scattered and such scattering may be detected as indicating the presence of asperities. Further, the pattern of scattered radiation becomes more diffuse with increasing defects. Thus, the measurement of scattered intensity provides the location and relative sizes of defects present on surface 13.

Figure 3:
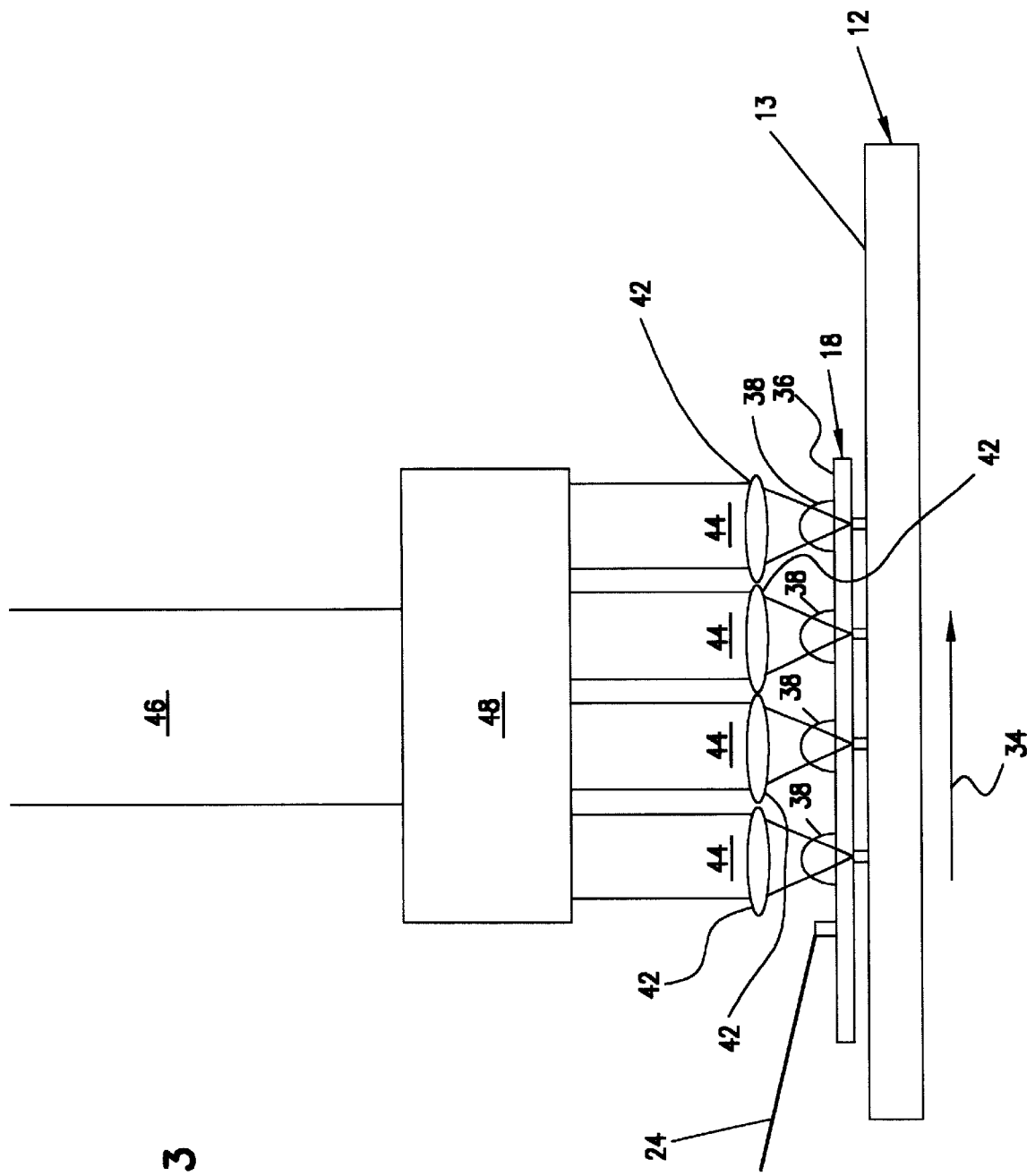
FIG. 3 is a side elevation view of an optical detect head flying over a disc in accordance with an alternative embodiment of the present invention.

FIG. 3 is a side elevation view of certifier head 18 flying over disc 12 as disc 12 moves in the direction of arrow 34. The embodiment shown in FIG. 3 is similar to that of FIG. 2 and similar elements are numbered similarly. The most notable difference between the embodiments of FIG. 3 and FIG. 2 is that in FIG. 3 certifying head 18 now includes multiple beam/lens systems. Thus, in FIG. 3, certifying head 18 includes a plurality of SIL's 38 disposed on a top surface of certifier head 18. For clarity, spacer tubes 40 and light source 45 are not shown in FIG. 3. By providing multiple beams 44 which are focussed through objective lenses 42 and finally through SIL's 38, a plurality of highly focussed beams can be directed onto surface 13 of disc 12. In this manner, a number of asperity detections can be done simultaneously, thus increasing asperity detection efficiency by covering more area. FIG. 3 also shows main beam 46 entering beam splitter 48, which splits main beam 46 into the plurality of beams 44. Beam splitter 48 may be any appropriate beam splitter known in the art.

Figure 4:
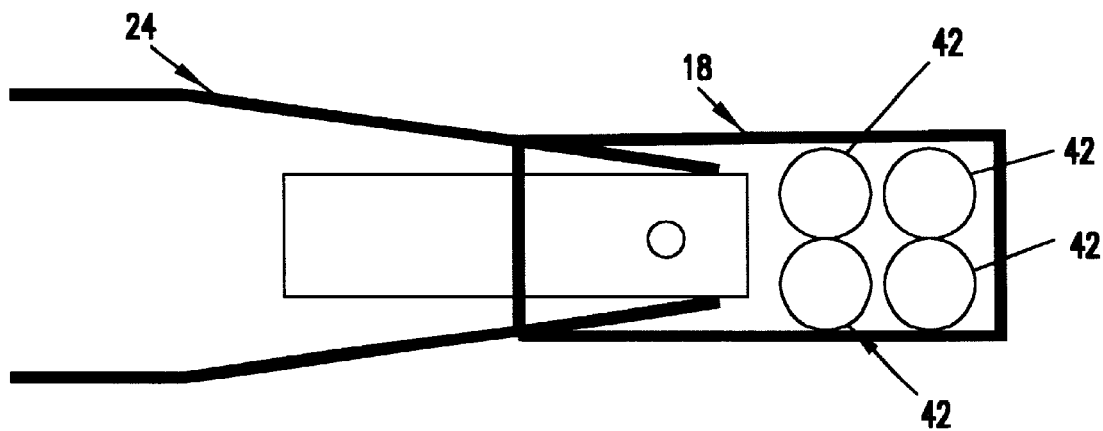
FIG. 4 is a top plan view of an optical detect head in accordance with yet another alternative embodiment of the present invention.

FIG. 4 is a top plan view of certifier head 18 coupled to gimbal 24. FIG. 4 shows a plurality of objective lenses 42 disposed not only longitudinally (as shown in FIG. 3) along certifier head 18, but also transversely thereacross. Thus, those skilled in the art will appreciate that a matrix of beam/lens assemblies may be formed on certifier head 18 to create a number of asperity detection beams such that asperity detection may thereby be further enhanced.

Figure 5:
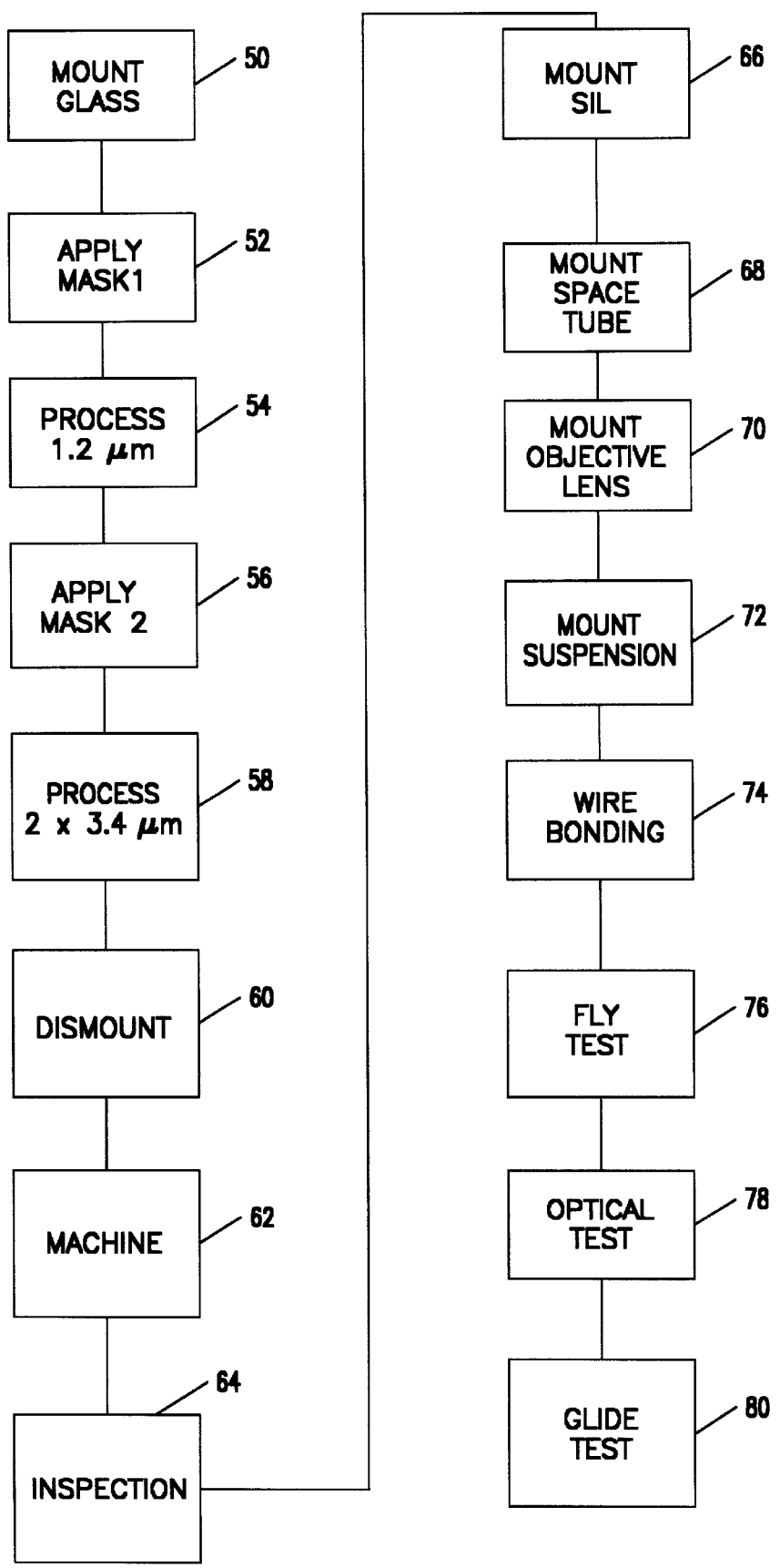
FIG. 5 is a block diagram of a process for marking the optical certifying head of the present invention.

FIG. 5 is a flow diagram showing a sequence of steps to be performed in order to manufacture an optical certifier head in accordance with the present invention. Initially, a high refractive index glass is mounted to an Advanced Air Bearing (AAB) carrier, as indicated at block 50. Subsequently, a first mask is applied for the leading edge ion mill, as indicated at block 52. Then, the standard AAB process is employed at 1.2 $\mu$m, as indicated at block 54. After the standard AAB process is completed, a second mask is applied for the cavity ion mill, as indicated at block 56. Then, the standard AAB process is used once again at 2×3.4 $\mu$m, as indicated at block 58. At this stage, the glass is dismounted from the AAB carrier as indicated at block 60.

Appropriate machining is performed upon the dismounted glass, as indicated at block 62. Subsequently, the machined glass is inspected for flaws and defects as indicated at block 64. Then, optical assembly begins starting with mounting the SIL on the glass, as indicated at block 66. After the SIL is mounted, a spacer tube is placed on the glass about the SIL, as indicated by block 68. Then, the objective lens is mounted to the spacer tube, as indicated at block 70. Subsequently, the glass is mounted to a suspension, such as gimbal 24 (shown in FIGS. 2 and 3), as indicated at block 72. The mounted suspension is then preferably wire-bonded in order to make electrical connections, as indicated at block 74. The assembly is then fly tested, optically tested, and glide tested, as indicated by blocks 76, 78 and 80, respectively.

Although the present invention has been described with reference to preferred embodiments, workers skilled in the art will recognize that changes may be made in form and detail without departing from the spirit and scope of the invention.

What is claimed is:

1. An apparatus for optically mapping asperities on a rotating disc surface, of a disc to be screened, the apparatus comprising:
   a controller;
   an actuator coupled to the controller;
   a suspension assembly coupled to the actuator;
   an optical certifier head including a first SIL and an air bearing slider, the head coupled to the suspension assembly such that the head is disposed within an evanescent decay length from the rotating disc surface, and wherein the controller causes movement of the head over the surface of the rotating disc;
   a light source operably coupled to the certifier head such that light is focussed through the first SIL onto the disc surface by near field coupling;
   a sensor operably coupled to the head and to the controller, the sensor providing a signal based upon an intensity of light reflected from the disc, the signal having a normal characteristic output signal during normal operation, and an asperity characteristic output signal when an asperity disc surface is within the evanescent decay length of the head; and wherein the controller correlates the asperity characteristic output signal with a location on the disc surface.

2. The apparatus of claim 1 and further comprising an encoder operably coupled to the disc and also coupled to the controller, the encoder providing an encoder signal based upon an angular displacement of the disc.

3. The apparatus of claim 1 wherein the light provided by the light source is laser light.

4. The apparatus of claim 1 and further comprising a first lens assembly, the first lens assembly including:

a first spacer tube disposed on the air bearing slider about the first SIL; and a first objective lens coupled to the first spacer tube and spaced from the first SIL by a distance approximately equal to a focal length of the first objective lens such that at least a portion of light focussed through the certifier head is focussed through the first objective lens and the SIL.

5. The apparatus of claim 4 and further comprising a second lens assembly, the second lens assembly comprising:

a second SIL disposed on the air bearing slider;

a second spacer tube disposed on the air bearing slider about the second SIL;

a second objective lens coupled to the second spacer tube and spaced from the second SIL by a distance approximately equal to a focal length of the second objective lens such that at least a portion of light focussed through the certifier head is focussed through the second object lens and the second SIL; and wherein asperities on the disc surface are identified as a function of light focussed through the first and second SILs.

6. The apparatus of claim 5 and further comprising a beam splitter receiving a source beam and providing an individual split beam to each lens assembly.

7. The apparatus of claim 5 wherein the air bearing slider has a longitudinal axis, and the first lens assembly and the second lens assembly are spaced from one another along the longitudinal axis of the air bearing slider.

8. The apparatus of claim 5 wherein the air bearing slider has a transverse axis and, the first lens assembly and the second lens assembly are spaced from one another along the transverse axis of the air bearing slider.

9. The apparatus of claim 1 wherein the air bearing slider includes at least one transparent portion through which the light passes.

10. A method of detecting asperities on a surface of a rotating disc, the method comprising the steps of:

providing a first light beam;

focussing the first light beam through a first SIL;

optically coupling the focussed first light beam to the disc surface through near-field coupling; and measuring an intensity of first reflected light from the disc surface; and determining asperity presence based upon the measured intensity of first reflected light.

11. The method of claim 10 wherein the step of focussing the first light beam includes the steps of:

directing the first light beam through an objective lens to create an objective lens focussed beam; and directing the objective lens focussed beam through a SIL to create the first SIL focussed beam.

12. The method of claim 10 wherein the step of optically coupling the focussed first light beam to the disc surface through near-field coupling includes the step of flying a transparent slider within an evanescent decay length of the disc surface.

13. The method of claim 10 and further comprising:

providing a second light beam;

focusing the second light beam through a second SIL;

optically coupling the focussed second light beam to the disc surface through near-field coupling; and measuring an intensity of second reflected light reflected from the disc surface simultaneously with the step of measuring an intensity of first reflected light from the disc surface.

14. An apparatus for optically mapping asperities on a rotating disc surface, the apparatus comprising:

optical head means for coupling an optical signal to the disc surface and providing a reflected signal output; and means for detecting an asperity on the disc surface as a function of the reflected signal output.

* * * * *